Figure 1:
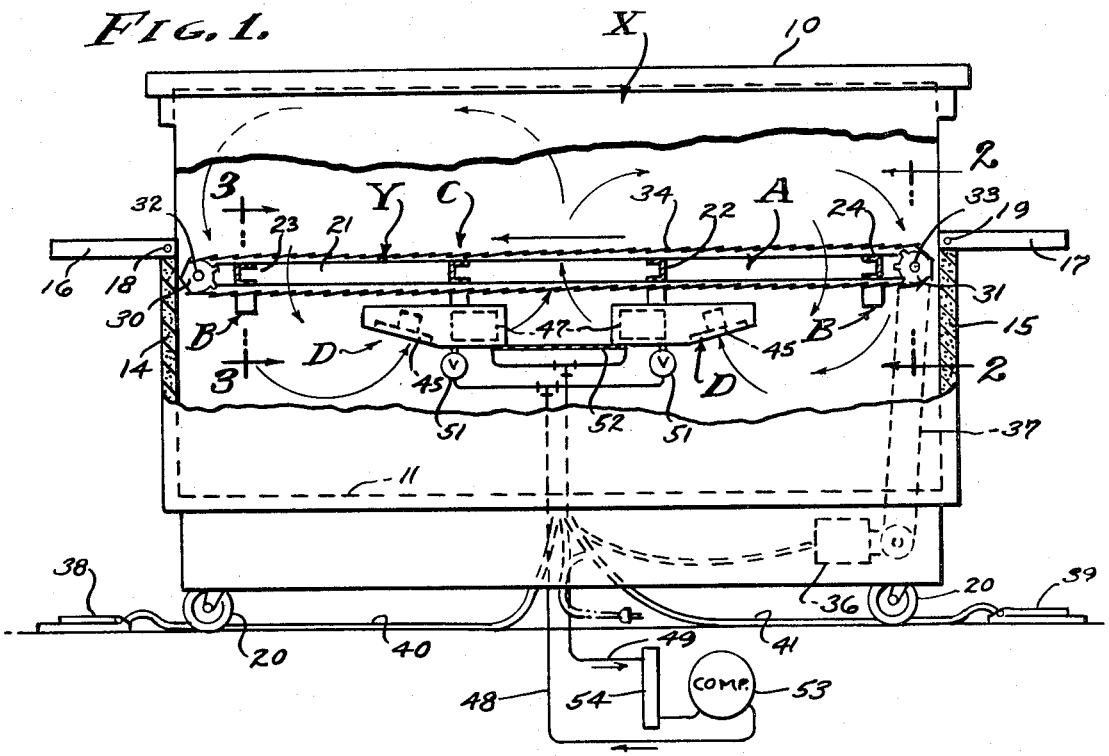

United States Patent [19]

Anderson

[11] 3,772,898
[45] Nov. 20, 1973

[54] FREEZER WITH REMOVABLE CONVEYOR AND REFRIGERATING MEANS

[76] Inventor: William G. Anderson, 5942 Gildred Cir., Huntington Beach, Calif. 92647

[22] Filed: Feb. 10, 1972

[21] Appl. No.: 225,103

[52] U.S. Cl............... 62/302, 62/303, 62/380, 62/448
[51] Int. Cl............................................. F25d 23/12
[58] Field of Search................. 62/62, 302, 380, 62/448, 449, 303

[56] References Cited
UNITED STATES PATENTS

| | | | |
|---|---|---|---|
| 3,115,756 | 12/1963 | Overbye | 62/63 X |
| 3,494,140 | 2/1970 | Harper et al. | 62/302 X |
| 3,296,812 | 1/1967 | Cloudy | 62/63 |
| 3,427,820 | 2/1969 | Hart | 62/380 X |
| 3,601,901 | 8/1971 | Rader | 62/303 X |

*Primary Examiner*—Meyer Perlin
*Assistant Examiner*—Ronald C. Capossela
*Attorney*—William H. Maxwell

[57] ABSTRACT

An open ended freezing cabinet housing a motorized conveyor upon which articles to be chilled are transported through a frost producing environment, there being complementary refrigerating units disposed so as to recirculate air through the cabinet without discharging the same, and there being a chassis that removeably carries the conveyor and said refrigerating units, and a refrigeration compressor and conveyor controls universally remote from the cabinet for supplying refrigerant and for conveyor control respectively.

7 Claims, 4 Drawing Figures

FREEZER WITH REMOVABLE CONVEYOR AND REFRIGERATING MEANS

BACKGROUND:

Articles such as glassware are chilled prior to serving foods and drinks therein, and the process requires the absorption of heat in order to obtain the tempering desired. Thus, problems arise in the tempering of large numbers of such articles, for example in places of businesses that serve beverages to many people, it being usual to serve hundreds and as many as a thousand drinks per hour at a single place of business selling soft drinks as a refreshment. Therefore, the continuous chilling of large numbers of glasses is a requirement, the quantity of glasses to be processed being dependent upon the prevailing business requirements. The source of cold is readily supplied by refrigeration means, this invention residing in the cabinet and a removeable conveyor and complementary refrigerating units, and all of which lends itself to the sanitary requirements involved with the sale of foods and beverages and which also lends itself to control commensurate with demand. That is, food handling equipment is required to be readily disassembled for cleaning, and the removeable parts and elements easily cleaned with thoroughness. Also, the immersion time required in soaking the articles, such as glasses, in the cold environment created by the refrigeration is to be maintained above a predetermined minimum, and which permits prolongation of immersion time in order to effect the quantity or volume control. It is to these ends therefore, that I have provided a freezer for frosting mugs and the like, wherein immersion of the article in a cold environment is controlled to extend beyond a minimum time period, the means therefore being unitized in a removeable chassis installed in an open ended cabinet and arranged so that the cold atmosphere therein is continuously recirculated with substantially little loss of cold, and to the end that heat is efficiently absorbed from the articles being chilled.

FIELD OF INVENTION:

This invention relates to the continuous processing of articles, to absorb heat therefrom and to thereby temper the same by chilling. It is glassware or drinking mugs which are, for example, to be chilled and thereby frosted as a result of the moisture in the air condensing and freezing thereon. In fact, there is a freezing condition that is to be applied to the mugs after they have been washed and retain heat to a substantial degree. It is an object therefore, to provide for the efficient immersion of such articles in a cold environment over said articles to absorb heat therefrom and thereby tempering them to a cold and/or freezing condition. With the present invention, complementary refrigerating units work in opposition to simultaneously draw the internal atmosphere in the cabinet intermediate the ends thereof and deliver it in opposite directions toward the opposite ends of the cabinet; there being two independently moving columns of air that jointly occupy the interior of the cabinet and which are inherently recirculated with minimal loss by virtue of the suction demand within the cabinet and of the dynamic operation conditions.

An object of this invention is to provide a freezing cabinet of the character referred to above and having sanitary features, and mainly the ability to be completely cleansed or renovated with facility. With the present invention, the food and/or drink handling portions of the freezer are removeable in their entirety as a unit.

Another object of this invention is to provide a freezing cabinet of the character referred to above and providing infinitely variable control over the speed of delivery, whereby chilled articles such as drinking mugs are processed therethrough at any desired rate slower than the predetermined time period required for the degree of chill required. With the present invention, control at and over both the intake and output of the freezer is effected according to the requirements of personnel performing the loading and unloading duties, through independent controls which are operable at the will of said personnel respectively.

SUMMARY OF INVENTION:

The freezer for frosting mugs and the like involves generally the means, parts and elements hereinafter described, as follows: There is a cabinet X open at opposite ends when in operating condition, there is a conveyor and freezer chassis Y removeably carried within the cabinet X, and there is a refrigeration compressor Z remoted or otherwise suitably installed to supply refrigerant under suitable pressure to be expanded and thereby absorb heat. The invention resides primarily in the conveyor and freezer chassis Y which comprises a frame A releasably secured to anchors B within the cabinet X, a conveyor C trained horizontally between the opposite open ends of the cabinet X, and a pair of complementary and oppositely disposed refrigerating units D pumping air within the cabinet X to move separated columns of air drawn centrally and delivered oppositely toward the opposite ends of the cabinet within the interior thereof and returned for recirculation without discharge through said opposite end openings, by virtue of the confining tunnel that is formed within the cabinet to ventilate only through the articles supported therein upon the conveyor. The various additional features and elements required for operation will be hereinafter described.

Figure 2:
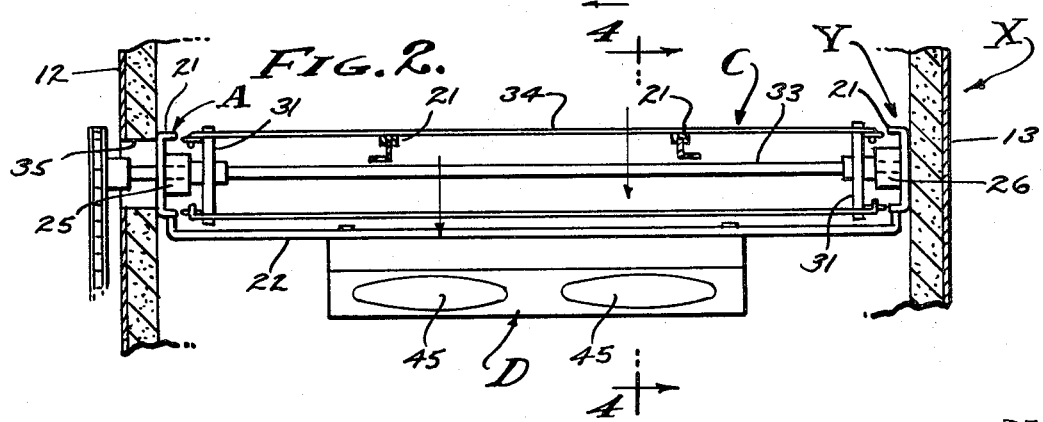
Figure 4:
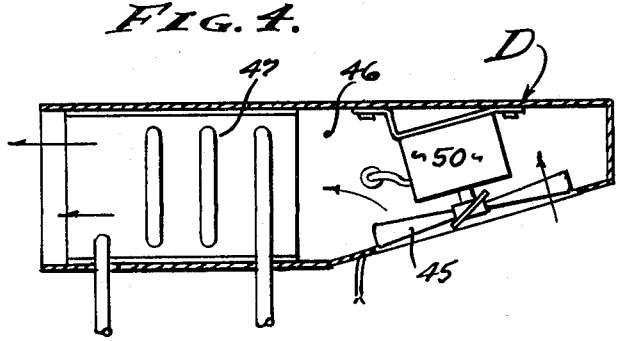
Figure 3:
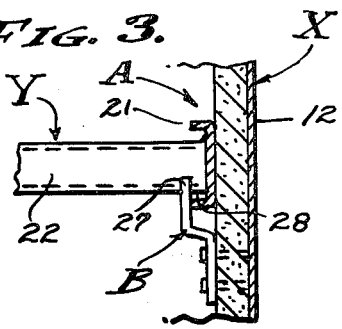

DRAWINGS:

The various objects and features of this invention will be fully understood from the following detailed description of the typical preferred form and application thereof, throughout which description reference is made to the accompanying drawings in which: FIG. 1 is a side elevation of the freezer of the present invention with portions thereof broken away to show in section. FIG. 2 is an enlarged transverse sectional view taken substantially as indicated by line 2—2 on FIG. 1. FIG. 3 is an enlarged fragmentary sectional view taken substantially as indicated by line 3—3 on FIG. 1, and FIG. 4 is an enlarged detailed sectional view of one of the refrigerating units and taken as indicated by line 4—4 on FIG. 2.

PREFERRED EMBODIMENT:

The cabinet X that is normally open at opposite ends is essentially a freezer case comprised of spaced top and bottom walls 10 and 11, spaced side walls 12 and 13, and spaced end walls 14 and 15. The walls 10–15 are planar elements having substantial thickness as developed by internal layers of heat insulation, the outside surfaces being imperforate panels of sheet material such as stainless steel. In practice, the size is important for utilitarian purposes, the height being approximately 42 inches with end doors 16 and 17 defined by a lower edge located at a working height of for example 28 inches; while the remaining dimensions of the cabinet may vary as circumstances require (a length of 50 to 80 inches and a width of 32 inches). In accordance with this invention, the end doors 16 and 17 open and lie horizontally in the working plane (28 inches high) when the freezer is in use, or they can be closed when the freezer is out of use or in order to conserve the cold condition therein. As shown, the doors 16 and 17 are coextensive in width with the cabinet, being hinged at their lower margins 18 and 19 onto their respective end walls 14 and 15. Suitable latches and stops (not shown) are employed to maintain the said closed and open conditions of the two doors, as indicated. The cabinet X is supported upon legs, or as is preferred it is moveably supported upon casters 20 at each corner thereof.

The chassis Y that is removeably carried within the cabinet X is a combination conveyor and refrigeration unit, and is comprised of the elements A through D that will now be individually described. Generally, the frame A is a rigid structure that substantially occupies the cabinet X, in plan configuration conforming to the interior dimensions of the cabinet chamber with clearance. Although the frame A can vary in its structural detail, it is comprised of one or more longitudinal members 21 and transverse spreaders 22, with or without bracing therebetween and such as to establish spaced end headers 23 and 24 that support spaced side bearings on transverse axes one parallel with the other. In practice, antifriction bearings 25 and 26 are supported in the end portion of spaced and parallel side members 21 held apart by a plurality of spaced spreaders 22, the frame A being horizontally disposed at and/or immediately below the working plane of the freezer coincidental with the coplanar lower edges of the doors 16 and 17.

The anchors B that releasably hold the frame A in working position within the cabinet X are disposed at spaced positions of stability about the center of gravity involved in the frame-conveyor-refrigerating units. A most practical arrangement is the provision of an anchor B at each corner of the freezer, and such as to support the frame A at each of the bearings 25 and 26. In the preferred and simple form, each anchor B is an upwardly disposed saddle-shaped part 27 adapted to seat a complementary positioning lug 28 or part of the frame A. A lug 28 or frame part underlies the frame in the area of each bearing, and the part 27 is fastened to the interior side wall of the cabinet with the seats of the anchors coplanar to receive and positionably support the lugs 28. As shown, the anchor parts 27 open upwardly so as to release the frame A when it is lifted for removal through either door opening.

The conveyor C that is trained between the opposite ends of cabinet X is carried on the axes of the bearings 25 and 26 so as to present a transporting planar surface at the said working height hereinabove referred to. To these ends, the conveyor C involves spaced pulleys or sprockets 30 and 31 rotatably journaled by shafts 32 and 33 on the axes of bearing 25 and 26 respectively. A chain of spaced interconnecting transverse members or of spaced interconnected longitudinal links, or any other suitable flexible and ventilated belt structure 34 is looped continuously over the two sprockets 30 and 31; the upper section thereof being supported by the longitudinal members 21 of the frame acting as rails. Thus, the upper section of the conveyor C presents a moveable transporting surface for the support of articles to be moved through the freezer cabinet X.

The conveyor C is motorized by a prime mover M installed at the exterior of the cabinet X, and to these ends the cabinet wall 13 is provided with an opening 35 through which the shaft 33 projects for driving engagement with the prime mover M. In practice, an electric motor 36 is the prime mover, and transmission of torque to shaft 33 is by means of a chain 37, the drive shaft 33 being removeable. A gear head motor 36 is employed and which drives the shaft 33 at a slow rate commensurate with the speed required in slowly advancing articles through the cabinet X as and when required. Control of motor 36 is by means of normally open foot switches 38 and 39 connected in electrical parallel circuits thereto from a suitable power source of electrical energy. These two foot switches 38 and 39 are located at the terminal ends of electrical cables 40 and 41 extending from each end of cabinet X, to be actuated by personnel operating the freezer in order to advance the articles from the intake end to the output end, as circumstances require.

The refrigerating units D that are oppositely disposed to move separate columns of air centrally through and toward opposite ends of the cabinet X are dependently operable; however, it is contemplated that a single refrigerating unit can be employed with a division of two independent columns of air moved in relation to each end opening of the cabinet. Preferably, the two dependent columns of air are established by interdependent refrigerating units D faced in opposition to deliver opposing air columns from the remote ends of the cabinet X toward the center thereof.

In accordance with this invention, the pressured discharge of refrigerated air is central of or intermediate the opposite ends of the cabinet X, and accordingly there are two separate intake columns of refrigerated air from the said opposite open ends of the cabinet. As shown, this separated air column concept is established by the two interdependent refrigerating units D and each of which involves an intake fan 45 receiving air from one end portion of the cabinet X and discharging into a planum 46 occupied by a freezing coil 47. The coil 47 is finned and tempers the air column passing therethrough, and the plenum 46 then discharges inwardly of the cabinet below the conveyor C.

Each refrigerating unit D is powered by a motor 50 operating the fan 45, a suction fan driving the air column into the plenum 46. Refrigerant is supplied to the coil 47 through an expansion valve 51 from the refrigeration compressor Z which supplies compressed refrigerant to the coil 47 through inlet line 48 and which receives expanded refrigerant from the coil 47 through return line 49. The two refrigerating units D deliver comingled columns of refrigerated air upwardly therebetween, being spaced, and if required a baffle 52 extends beneath the discharge of the two spaced plenums 46. As a result, the pressured discharge of refrigerated air necessarily diverges through the conveyor C and any articles supported thereon and is dispersed oppositely and longitudinally in the form of two columns of air, and one toward each opposite end of the cabinet. A feature of the freezer is the unrestricted ventilation downwardly through the conveyor C and any articles carried thereon, whereby the negative suction pressures of the fans 45 draw volumes of air equal to the volume of said central pressure discharge, and all to the end that substantially all refrigerated air is recaptured and then recirculated.

From the foregoing it will be seen that a simple and practical freezer for the chilling of mugs and the like is provided. The doors 16 and 17 drop to the stopped positions shown where they form inlet and outlet tables coplanar with the supporting surface of the moving conveyor C that transports the mugs through the interior of the cabinet. The sprocket supported end portions of the conveyor C closely approach the door openings and it is therefore a simple matter to deposit mugs upon that portion of the conveyor at the inlet end of the cabinet X and to retrieve mugs from that portion of the conveyor at the outlet end of the cabinet. Thus, the foot switches 38 and 39 are activated so as to remove mugs into the cabinet at the inlet end thereof and to remove mugs out of the cabinet at the outlet end thereof. The refrigeration compressor Z is suitably powered and is equipped with the usual pump 53 and condenser 54 and automatic controls, and all to the end that the refrigeration is self-sufficient and operates to continuously remove heat from the mugs or like articles that are conveyed through the cabinet X.

Having described only a typical preferred form and application of my invention, I do not wish to be limited or restricted to the specific details herein set forth, but wish to reserve to myself any modifications or variations that may appear to those skilled in the art:

I claim:

1. A freezer for chilling articles including, an elongated cabinet with heat insulated walls to maintain a cold environment interior and there being article input and output openings in the opposite end walls of the cabinet respectively, spaced anchors carried on the interior walls of the cabinet, a horizontally disposed chassis removeably supported upon said spaced anchors and extending longitudinally between the opposite end openings and having bearings on spaced parallel axes at the interior of the cabinet near each opening respectively, a conveyor belt trained over spaced sprockets journaled in said bearings and adapted to receive articles through said input opening and to deliver articles to said output opening, prime mover means at the exterior of the cabinet and disengageably coupled to the conveyor to move the upper section thereof to transport articles from said input to said output opening, and refrigeration means tempering the interior of the cabinet to absorb heat from the articles transported therethrough, said refrigeration means being suspended beneath the chassis and conveyor and said chassis-conveyor-refrigeration means being proportioned as a unit to pass through one of said end openings of the cabinet.

2. A freezer for maintaining a cold environment within an elongated cabinet and comprising; heat insulated side and end walls and a bottom wall at a substantial depth and with opposite end wall openings, an article supporting vertically ventilated rack extending horizontally through the cabinet in accessible alignment with said end wall openings and substantially spaced above said bottom wall for the passage of air both upwardly and downwardly therethrough, and refrigeration means within the cabinet and suspended beneath the ventilated article supporting rack, having fan means drawing separate columns of interior air from the opposite ends of the cabinet, having refrigerating means absorbing heat from said oppositely drawn air, and having discharge means comingling said separate columns of refrigerated air and dispersing the same into the elongated cabinet together and vertically through the ventilated article supporting rack intermediate the said opposite open ends of the cabinet, whereby recirculation of refrigerated air is achieved.

3. The air recirculating freezer as set forth in claim 2 wherein the refrigeration means is suspended from the article supporting rack and wherein said discharge means disperses the comingled air centrally therethrough, the recirculation of air being separated into oppositely moving columns drawn downwardly through the ventilated article supporting rack at opposite ends of the cabinet.

4. The air recirculating freezer as set forth in claim 2 wherein the ventilated article supporting rack includes a conveyor and a drive means therefor propelling an upper article supporting surface to move between said opposite end wall openings of the cabinet.

5. The air recirculating freezer as set forth in claim 2 wherein the refrigeration means comprises a pair of spaced refrigeration units with opposed discharge plenums in common and dispersing the comingled air upwardly and longitudinally in opposite directions for the downward recirculation of air into said separate columns within opposite ends of the cabinet.

6. The air recirculating freezer as set forth in claim 2 wherein the refrigeration means comprises a pair of depending refrigeration units suspended from the article supporting rack and each with a discharge plenum opposed to the other and in common dispersing the comingled air upward through said rack and longitudinally in opposite directions as separate columns toward the opposite ends of the cabinet for the downward recirculation of air within opposite ends of the cabinet.

7. The air recirculating freezer as set forth in claim 2 wherein the refrigeration means comprises a pair of depending refrigeration units suspended from the article supporting rack and each with independent fan means and a discharge plenum opposed to the other and in common dispersing the comingled air upwardly through said combined rack and longitudinally in opposite directions as separate columns toward the opposite ends of the cabinet for the downward recirculation of air within opposite ends of the cabinet.

* * * * *